United States Patent [19]

Frame

[11] 4,299,729
[45] * Nov. 10, 1981

[54] METHOD OF REACTIVATING A CATALYTIC COMPOSITE OF AN ADSORPTIVE CARRIER MATERIAL AND A MERCAPTAN OXIDATION CATALYST

[75] Inventor: Robert R. Frame, Glenview, Ill.

[73] Assignee: UOP Inc., Des Plaines, Ill.

[*] Notice: The portion of the term of this patent subsequent to Jul. 22, 1997, has been disclaimed.

[21] Appl. No.: 156,440

[22] Filed: Jun. 4, 1980

Related U.S. Application Data

[63] Continuation-in-part of Ser. No. 973,303, Dec. 26, 1978, Pat. No. 4,213,877.

[51] Int. Cl.$^3$ .................... B01J 31/40; C10G 19/08
[52] U.S. Cl. .................................. 252/412; 208/206
[58] Field of Search .................. 252/412, 414, 420; 208/206, 207

[56] References Cited

U.S. PATENT DOCUMENTS

| | | | |
|---|---|---|---|
| 3,148,156 | 9/1964 | Henry | 252/420 |
| 3,326,816 | 6/1967 | Urban | 252/413 |
| 4,009,120 | 2/1977 | Hilfman | 252/413 |
| 4,213,877 | 7/1980 | Frame | 252/412 |

*Primary Examiner*—P. E. Konopka
*Attorney, Agent, or Firm*—James R. Hoatson, Jr.; Gregory J. Mancuso; William H. Page, II

[57] ABSTRACT

A method of reactivating a mercaptan oxidation catalytic composite of an adsorptive support and a metal chelate comprising the steps of first contacting the composite with an aqueous ammoniacal solution of a metal chelate, and second contacting the composite with an aqueous solution of a quaternary ammonium compound at a temperature of from about 55° C. to about 175° C.

18 Claims, No Drawings

METHOD OF REACTIVATING A CATALYTIC COMPOSITE OF AN ADSORPTIVE CARRIER MATERIAL AND A MERCAPTAN OXIDATION CATALYST

CROSS-REFERENCE TO RELATED APPLICATION

This application is a continuation-in-part of my copending application U.S. Ser. No. 973,303, filed on Dec. 26, 1978 and issued as U.S. Pat. No. 4,213,877 on July 22, 1980, the teachings of which are incorporated herein by reference.

BACKGROUND OF THE INVENTION

Processes for the oxidation and conversion of mercaptans contained in a sour petroleum distillate wherein the distillate is treated in admixture with an oxidizing agent in contact with a metal chelate mercaptan oxidation catalyst at oxidation reaction conditions, have become well-known and widely-practiced in the petroleum refining industry. Said processes are often advantageously effected in a fixed bed treating system wherein the metal chelate mercaptan oxidation catalyst is adsorbed or impregnated on a solid adsorbent support or carrier material disposed as a fixed bed in a treating column. The sour distillate is typically passed in contact with the catalytic composite in admixture with an oxidizing agent and an aqueous caustic solution. The catalytic composite generally requires periodic reactivation, reactivation being effected in situ, for example, by water-washing at an elevated temperature in accordance with the method of U.S. Pat. No. 3,148,156, or water-washing at an elevated temperature followed by a steam treatment in accordance with the method of U.S. Pat. No. 4,009,120, or sequentially washing the catalytic composite with water, dilute acetic acid and alcohol pursuant to the method of U.S. Pat. No. 3,326,816, the washing in some cases being followed by reimpregnation to re-establish a desired concentration of the metal chelate component of the catalytic composite. In time, depending on the character of the sour petroleum distillate being treated, the catalytic composite will no longer respond to conventional reactivation methods and must be replaced.

SUMMARY OF THE INVENTION

It is an object of this invention to provide an improved method of reactivation, particularly with respect to those deactivated catalysts which are no longer suitably reactivated by the more conventional methods.

In one of its broad aspects, the present invention embodies a method of reactivating a catalytic composite comprising an adsorptive carrier material and a metal chelate mercaptan oxidation catalyst, which comprises sequentially contacting said composite first with an aqueous ammoniacal solution of a metal chelate, and thereafter with an aqueous quaternary ammonium compound solution at a temperature of from about 55° C. to about 175° C.

One of the more specific embodiments of this invention concerns a method of reactivating a catalytic composite comprising an activated charcoal carrier material and a metal phthalocyanine mercaptan oxidation catalyst, which comprises sequentially contacting said composite first with an aqueous ammoniacal solution of a cobalt phthalocyanine monosulfonate, and thereafter with an aqueous quaternary ammonium compound solution at a temperature of from about 55° C. to about 175° C., said quaternary ammonium compound being represented by the structural formula:

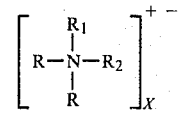

wherein R is a hydrocarbon radical containing up to about 20 carbon atoms and selected from the group consisting of alkyl, cycloalkyl, aryl, alkaryl and aralkyl, $R_1$ is a substantially straight chain alkyl radical containing from about 5 to about 20 carbon atoms, $R_2$ is selected from the group consisting of aryl, alkaryl and aralkyl, and X is an anion, for example, chloride, hydroxide, nitrate, nitrite, sulfate, phosphate, citrate, tartrate, and the like.

A still more specific embodiment relates to a method which comprises sequentially contacting said catalytic composite first with an aqueous solution comprising from about 0.1 wt. % to about 5 wt. % ammonium hydroxide and from about 0.01 wt. % to about 1 wt. % cobalt phthalocyanine monosulfonate, and thereafter with an aqueous benzyldimethylalkylammonium hydroxide solution at a temperature of from about 55° C. to about 175° C., the alkyl substituent of said benzyldimethylalkylammonium hydroxide being a substantially straight chain alkyl radical containing from about 12 to about 18 carbon atoms.

Other objects and embodiments of this invention will become apparent in the following detailed specification.

DETAILED DESCRIPTION OF THE INVENTION

The adsorptive carrier material component of the catalytic composite herein contemplated, can be any of the well-known solid adsorbent materials generally utilized as a catalyst support or carrier material. Preferred adsorbent materials include the various charcoals produced by the destructive distillation of wood, peat, lignite, nut shells, bones, and other carbonaceous matter, and preferably such charcoals as have been heat treated, or chemically treated, or both, to form a highly porous particle structure of increased adsorbent capacity, and generally defined as activated carbon or charcoal. Said adsorbent materials also include the naturally occurring clays and silicates, e.g. diatomaceous earth, Fuller's earth, kieslguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate, the solid adsorbent carrier material should be insoluble in, and otherwise inert to, the petroleum distillate at the alkaline reaction conditions existing in the treating zone. In the latter case, charcoal, and particularly activated charcoal, is preferred because of its capacity for the metal chelate, especially the metal phthalocyanines, and because of its stability under treating conditions.

The metal chelate component of the catalytic composite can be any of the various metal chelates known to the treating art as effective to cataylze the oxidation of mercaptans contained in a sour petroleum distillate with the formation of polysulfide oxidation products. Said catalysts include the metal compounds of tetrapyridinoporphyrazine described in U.S. Pat. No. 3,980,582, e.g. cobalt tetrapyridinoporphyrazine; porphyrin and metaloporphyrin catalysts as described in U.S. Pat. No. 2,966,453, e.g. cobalt tetraphenylporphyrin sulfonate; corrinoid catalysts as described in U.S. Pat. No. 3,252,892, e.g. cobalt corrin sulfonate; chelate organo-metallic catalysts such as described in U.S. Pat. No. 2,918,426, e.g. the condensation product of an aminophenol and a metal of Group VIII; and the like. Metal phthalocyanines are a preferred class of mercaptan oxidation catalysts.

The metal phthalocyanines employed as a mercaptan oxidation catalysts generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g. cobalt phthalocyanine monosulfonate, cobalt phthalocyanine disulfonate, or a mixture thereof, being particularly preferred. The sulfonated derivatives may be prepared, e.g. by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The metal chelate mercaptan oxidation catalysts, particularly the metal phthalocyanines, are readily adsorbed or impregnated on the solid adsorbent support or carrier material to produce the catalytic composite herein contemplated. In general, up to about 25 wt. % metal phtalocyanine can be adsorbed or impregnated on the solid adsorbent support and still form a stable catalytic composite. A less amount in the range of from about 0.1 to about 10 wt. % will usually be preferred. The metal chelate component is generally composited with the solid adsorbent support utilizing conventional techniques whereby the support, in the form of spheres, pills, pellets, granules or other particles of uniform or irregular size or shape, is soaked, suspended, dipped one or more times, or otherwise immersed in an aqueous or alcoholic impregnating solution and/or dispersion to adsorb a given quantity of the metal chelate component thereon. One preferred method involves the use of a steam-jacketed rotary dryer. The adsorbent support is immersed in the impregnating solution and/or dispersion contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditons, or dried at an elevated temperature in an oven, or in a flow of hot gases, or in any other suitable manner.

In the process of sweetening a sour petroleum distillate, it is the practice to oxidize the mercaptans contained therein in the presence of an alkaline reagent. A supported mercaptan oxidation catalyst is typically initially saturated with the alkaline reagent, and the alkaline reagent is thereafter passed in contact with the catalyst bed, continuously or intermittently as required, admixed with the sour petroleum distillate. Any suitable alkaline reagent may be employed. An alkaline metal hydroxide in aqueous solution, e.g. sodium hydroxide in aqueous solution, is most often employed. The solution may further comprise a solubilizer to promote mercaptan solubility, e.g. alcohol, and especially methanol, ethanol, n-propanol, isopropanol, etc., and also phenyls, cresols, and the like. A particularly preferred alkaline reagent is an aqueous caustic solution comprising from about 2 to about 30 wt. % sodium hyrdoxide. The solubilizer, when employed, is preferably methanol, and the alkaline solution may suitably comprise from about 2 to about 100 vol. % thereof. Sodium hydroxide and potassium hydroxide constitute the preferred alkaline reagent, others including lithium hydroxide, rubidium hydroxide and cesium hydroxide are also suitably employed.

The treating process is usually effected at ambient temperature conditions, although higher temperatures up to about 105° C. are suitably employed. Pressures of up to about 1000 psi or more are operable, although atmospheric or substantially atmospheric pressures are entirely suitable. Contact times equivalent to a liquid hourly space velocity of from about 0.5 to about 10 or more are effected to achieve a desired reduction in the mercaptan content of a sour petroleum distillate, and optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

The sour petroleum distillates commonly treated in contact with the described catalytic composite vary widely in composition depending on the source of the petroleum from which the distillate was derived, the boiling range of the distillate, and the method of processing the petroleum to produce the distillate. These differences largely determine the rate of catalyst deactivation as well as the extent to which the catalyst is deactivated. The differences include the character and concentration of the acidic and other non-hydrocarbon impurities, usually olefinic and phenolic materials, which occur in greater concentration in the higher boiling distillates. These impurities, while not necessarily adsorbed on the catalytic composite, in the state in which they exist in the distillates, are readily adsorbed in the higher oxidation state induced by the oxidation conditions of the treating process. The higher boiling distillates, for example kerosene, jet fuel, and the like, will further generally contain the more difficultly oxidized mercaptans, that is, the caustic insoluble, highly hindered branched chain and aromatic thiols, especially the higher molecular tertiary and polyfunctional mercaptans.

The method of this invention is of particular advantage with respect to the reactivation of the more difficultly reactivated catalysts, such as become deactivated in the treatment of the higher boiling sour petroleum distillates, or which have otherwise become deactivated beyond acceptable reactivation by conventional means.

Pursuant to the method of this invention, the catalytic composite is reactivated in a two-step operation. It is preferred that prior to the first step of the reactivation operation the catalytic composite be contacted with between about one and about three catalyst bed volumes of water of a temperature between about 50° C. and about 150° C. The purpose of hot water treatment is to strip from the composite some of the hot water soluble materials which may have accumulated on the composite during its use. Such a preliminary water wash, while not necessary for the practice of the method of this invention, can enhance the ability of the method of this invention to reactivate a deactivated catalyst. The preliminary water wash can be accomplished by any conventional means, such as by allowing the water to flow down through a bed of the deactivated catalyst.

The first step in the method of this invention is the contacting of the deactivated catalytic composite with an aqueous ammoniacal solution of a metal chelate. The metal chelate can be any of the metal chelates indicated hereinabove. Preferred metal chelates are metal phthalocyanines. Of the metal phthalocyanines, cobalt phthalocyanine and vanadium phtalocyanine are preferred. Cobalt phthalocyanine monosulfonate, cobalt phthalocyanine disulfonate, or a mixture thereof, are particularly preferred. It is not necessary to this invention that the metal chelate employed in the practice of the method of this invention be the same metal chelate which was disposed on the carrier during the preparation of the catalytic composite. The reaction mechanism by which a mercaptan oxidation catalyst promotes the oxidation of mercaptan sulfur to disulfides is not fully understood. It appears that a freshly prepared catalytic composite and a reactivated catalytic composite of the same constituents behave in substantially the same manner in oxidizing mercaptan sulfur. For this reason, the metal chelates indicated hereinabove as preferred in the preparation of a mercaptan oxidation catalytic composite are the same metal chelates which are preferred for use in the practice of the method of this invention.

Metal chelates are not as easily disposed on the deactivated catalytic composite as they are on the adsorptive carrier material during preparation of the catalytic composite. In addition, disposition of metal chelates on a deactivated mercaptan oxidation catalyst may result in a distribution of metal chelates on the catalytic composite which is different than the distribution of metal chelates on a catalytic composite which has not been used in a mercaptan oxidation reaction. It is believed that the method of this invention reactivates a deactivated mercaptan oxidation catalyst at least in part by facilitating a proper or advantageous distribution of metal chelate on the catalytic composite. The aqueous ammoniacal solution of the metal chelate employed in the method of this invention is dilute with respect to both the metal chelate and the ammonium hydroxide concentration. It is preferred that the metal chelate comprise from about 0.01 wt. % to 1 wt. % of the solution. It is especially preferred that the metal chelate comprise from about 0.01 wt. % to about 0.2 wt. % of the solution. It is preferred that the ammonium hydroxide comprise from about 0.1 wt. % to about 5 wt. % of the solution. It is especially preferred that the ammonium hydroxide comprise from about 0.1 wt. % to about 1 wt. % of the solution.

The temperature of the aqueous ammoniacal solution of the metal chelate is not critical to the method of this invention. It is preferred as a matter of convenience to conduct the first contacting step at from about 20° C. to about 150° C.

The first contacting step is preferably, although not necessarily, effected in situ, that is, with the catalytic composite disposed as a fixed bed in the treating column in which it has been used in the mercaptan oxidation process. Sufficient of the aqueous ammoniacal solution of a metal chelate can be charged and retained in the treating column to immerse the catalyst bed for a period of from about 2 to about 48 hours or more under quiescent conditions. It is a preferred practice to effect a continuous circulation of the solution through the treating column in contact with the deactivated catalytic composite. Satisfactory results can be obtained with a contact time of from about 2 hours to about 48 hours. Regardless of the particular method used to contact the solution with the catalytic composite, the optimal contact time will be the time necessary for equilibrium to be established between the concentration of metal chelate in solution and the concentration of metal chelate disposed on the catalytic composite.

The total amount of the metal chelate in the aqueous ammoniacal solution is a function of the amount of metal chelate desired to be disposed on the catalytic composite. Although up to about 25 wt. % metal chelate can be disposed on a carrier and still form a stable catalytic composite, the total amount of metal chelate which can be disposed on a deactivated catalytic composite is somewhat less. The deactivation process of a mercaptan oxidation catalyst is not fully understood. The deactivation occurs for reasons in addition to mere loss, by leaching or otherwise, of metal chelate from the composite. Thus, a simple replacement of the metal chelate, without more, does not produce a satisfactorily active and stable catalyst. Satisfactory reactivation can be accomplished by the method of this invention when the amount of metal chelate in the aqueous ammoniacal solution is from about 0.1 wt. % to about 1 wt. % relative to the amount of catalytic composite being contacted with the metal chelate solution.

The second step in the method of this invention is the contacting of the catalytic composite with an aqueous solution of a quaternary ammonium compound at a temperature of from about 55° C. to about 175° C. The quaternary ammonium compounds herein contemplated include such as tetramethylammonium hydroxide, tetraethylammonium hydroxide, tetrapropylammonium hydroxide, tetrabutylammonium hydroxide, trimethylethylammonium hydroxide, trimethylpropylammonium hydroxide, trimethylbutylammonium hydroxide, dimethyldiethylammonium hydroxide, dimethyldipropylammonium hydroxide, dimethyldibutylammonium hydroxide, methyltriethylammonium hydroxide, methyltripropylammonium hydroxide, methyltributylammonium hydroxide, phenyltrimethylammonium hydroxide, phenyltriethylammonium hydroxide, phenyltripropylammonium hydroxide, phenyltributylammonium hydroxide, benzyltrimethylammonium hydroxide, benzyltriethylammonium hydroxide, benzyltripropylammonium hydroxide, benzyltributylammonium hydroxide, diphenyldimethylammonium hydroxide, diphenyldiethylammonium hydroxide, diphenyldipropylammonium hydroxide, diphenyldibutylammonium hydroxide, dibenzyldimethylammonium hydroxide, dibenzyldiethylammonium hydroxide, dibenzyldipropylammonium hydroxide, dibenzyldibutylammonium hydroxide, triphenylmethylammonium hydroxide, triphenylethylammonium hydroxide, triphenylpropylammonium hydroxide, triphenylbutylammonium hydroxide, and the like.

A preferred class of quaternary ammonium compound is represented by the structural formula:

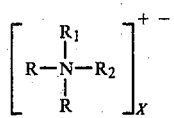

wherein R is a hydrocarbon radical containing up to about 20 carbon atoms and selected from the group consisting of alkyl, cycloalkyl, aryl, alkaryl and aralkyl, $R_1$ is a substantially straight chain alkyl radical containing from about 5 to about 20 carbon atoms, $R_2$ is selected from the group consisting of aryl, alkaryl and aralkyl, and X is an anion, for example, chloride, hydroxide, nitrate, nitrite, sulfate, phosphate, acetate, citrate, tartrate, and the like. $R_1$ is preferably an alkyl radical containing from about 12 to about 18 carbon atoms, $R_2$ is preferably benzyl, and X is preferably chloride and/or hydroxide. Preferred quaternary ammonium compounds thus include benzyldimethyldodecylammonium hydroxide, benzyldimethyltetradecylammonium hydroxide, benzyldimethylhexadecylammonium hydroxide, benzyldimethyloctadecylammonium chloride, and the like. Other suitable quaternary ammonium compounds include phenyldimethylpentylammonium chloride, phenyldipropylpentylammonium chloride, phenyldimethylhexylammonium chloride, phenyldiethylhexylammonium chloride, phenyldipropylhexylammonium chloride, phenyldimethyloctylammonium chloride, phenyldiethyloctylammonium chloride, phenyldipropyloctylammonium chloride, phenyldimethyldecylammonium chloride, phenyldiethyldecylammonium chloride, phenyldipropyldecylammonium chloride, phenyldimethyldodecylammonium chloride, phenyldiethyldodecylammonium chloride, phenyldipropyldodecylammonium chloride, phenyldimethyltetradecylammonium chloride, phenyldiethyltetradecylammonium chloride, phenyldipropyltetradecylammonium chloride, phenyldimethylhexadecylammonium chloride, phenyldiethylhexadecylammonium chloride, phenyldipropylhexadecylammonium chloride, phenyldimethyloctadecylammonium chloride, phenyldiethyloctadecylammonium chloride, phenyldipropyloctadecylammonium chloride, phenyldimethyleicosylammonium chloride, phenyldiethyleicosylammonium chloride, phenyldipropyleicosylammonium chloride, naphthyldimethylpentylammonium chloride, naphthyldiethylpentylammonium chloride, naphthyldipropylpentylammonium chloride, naphthyldimethylhexylammonium chloride, naphthyldiethylhexylammonium chloride, naphthyldipropylhexylammonium chloride, naphthyldimethyloctylammonium chloride, naphthyldiethyloctylammonium chloride, naphthyldipropyloctylammonium chloride, naphthyldimethyldecylammonium chloride, naphthyldiethyldecylammonium chloride, naphthyldipropyldecylammonium chloride, naphthyldimethyldodecylammonium chloride, naphthyldiethyldodecylammonium chloride, naphthyldipropyldodecylammonium chloride, naphthyldimethyltetradecylammonium chloride, naphthyldiethyltetradecylammonium chloride, naphthyldipropyltetradecylammonium chloride, naphthyldimethylhexadecylammonium chloride, naphthyldiethylhexadecylammonium chloride, naphthyldipropylhexadecylammonium chloride, naphthyldimethyloctadecylammonium chloride, naphthyldiethyloctadecylammonium chloride, naphthyldipropyloctadecylammonium chloride, benzyldimethylpentylammonium chloride, benzyldiethylpentylammonium chloride, benzyldipropylpentylammonium chloride, benzyldimethylhexylammonium chloride, benzyldiethylhexylammonium chloride, benzyldipropylhexylammonium chloride, benzyldimethyloctylammonium chloride, benzyldiethyloctylammonium chloride, benzyldipropyloctylammonium chloride, benzyldimethyldecylammonium chloride, benzyldiethyldecylammonium chloride, benzyldipropyldecylammonium chloride, benzydiethyldodecylammonium chloride, benzyldipropyldodecylammonium chloride, benzyldiethyltetradecylammonium chloride, benzyldipropyltetradecylammonium chloride, benzyldiethylhexadecylammonium chloride, benzyldipropylhexadecylammonium chloride, benzyldiethyloctadecylammonium chloride, benzyldipropyloctadecylammonium chloride, benzyldimethyleicosylammonium chloride, benzyldiethyleicosylammonium chloride, benzyldipropyleicosylammonium chloride, tolyldimethylpentylammonium chloride, tolyldiethylpentylammonium chloride, tolyldipropylpentylammonium chloride, tolyldimethylhexylammonium chloride, tolyldiethylhexylammonium chloride, tolyldipropylhexylammonium chloride, tolyldimethyloctylammonium chloride, tolyldiethyloctylammonium chloride, tolyldipropyloctylammonium chloride, tolyldimethyldecylammonium chloride, tolyldiethyldecylammonium chloride, tolyldipropyldecylammonium chloride, tolyldimethyldodecylammonium chloride, tolyldiethyldodecylammonium chloride, tolyldipropyldodecylammonium chloride, tolyldimethyltetradecylammonium chloride, tolyldiethyltetradecylammonium chloride, tolyldipropyltetradecylammonium chloride, tolyldimethylhexadecylammonium chloride, tolyldiethylhexadecylammonium chloride, tolyldipropylhexadecylammonium chloride, tolyldimethyloctadecylammonium chloride, tolyldiethyloctadecylammonium chloride, tolyldipropyloctadecylammonium chloride, tolyldimethyleicosylammonium chloride, tolyldiethyleicosylammonium chloride, tolyldipropyleicosylammonium chloride, diphenylmethylpentylammonium chloride, diphenylethylpentylammonium chloride, diphenylpropylpentylammonium chloride, diphenylmethylhexylammonium chloride, diphenylethylhexylammonium chloride, diphenylpropylhexylammonium chloride, diphenylmethyloctylammonium chloride, diphenylethyloctylammonium chloride, diphenylpropyloctylammonium chloride, diphenylmethyldecylammonium chloride, diphenylethyldecylammonium chloride, diphenylpropyldecylammonium chloride, diphenylmethyldodecylammonium chloride, diphenylethyldodecylammonium chloride, diphenylpropyldodecylammonium chloride, diphenylmethyltetradecylammonium chloride, diphenylethyltetradecylammonium chloride, diphenylpropyltetradecylammonium chloride, diphenylmethylhexadecylammonium chloride, diphenylethylhexadecylammonium chloride, diphenylpropylhexadecylammonium chloride, diphenylmethyloctadecylammonium chloride, diphenylethyloctadecylammonium chloride, diphenylpropyloctadecylammonium chloride, diphenylmethyleicosylammonium chloride, diphenylethyleicosylammonium chloride, diphenylpropyleicosylammonium chloride, as well as the corresponding flouride, bromide, iodide, hydroxide, sulfate, nitrate, nitrite, phosphate, acetate, citrate and tartrate compounds. In any case, the selected quaternary ammonium compound is suitably effective in aqueous solution in a concentration of from about 0.01 to about 10 wt. %.

The second contacting step is preferably, although not necessarily, effected in situ, with the catalytic composite disposed as a fixed bed in the treating column in which it has been used in the mercaptan oxidation process. Sufficient of the aqueous quaternary ammonium compound solution can be charged and retained in the treating column to immerse the catalyst bed for a period of from about 2 to about 48 hours or more under quiescent conditions, provided that the treating column embodies the necessary heating means. It is a preferred practice to effect a continuous circulation of the solution through the treating column in contact with the deactivated catalytic composite, the solution being recycled to the column through an external heating means. As in the case of the first contacting step, regardless of the particular method used to contact the solution with the catalytic composite, the optimal contact time will be the time necessary for equilibrium to be established, in this case between the concentration of quaternary ammonium compound in solution and the concentration of quaternary ammonium compound disposed on the catalytic composite.

The temperature of the solution of quaternary ammonium compound is important to the method of this invention. The temperature should be below the temperature of thermal decomposition of the particular quaternary ammonium compound selected. The temperature should be high enough to yield a satisfactory reactivated catalytic composite. While the mechanism of reactivation is not completely understood, it is believed that the advantageous results arising from the method of this invention are a result in part of the interaction of the quaternary ammonium compound with the metal chelate. It is further believed that conducting the second contacting step at a temperature within the range hereinabove specified facilitates that interaction. It is preferred to conduct the second contacting step at a temperature of from about 90° C. to about 110° C.

The total amount of quaternary ammonium compound in the aqueous solution is a function of the amount of quaternary ammonium compound desired to be disposed on the catalytic composite. Advantageous results in the practice of the method of this invention can be achieved when the amount of quaternary ammonium compound in the aqueous solution is from about 0.1 wt. % to about 1 wt. % relative to the amount of catalytic composite being contacted with the solution.

The following examples are presented in illustration of a certain preferred embodiment of this invention and are not intended as an undue limitation on the generally broad scope of the invention as set out in the appended claims.

EXAMPLE I

This example illustrates the reactivation of a catalytic composite using hot water and a quaternary ammonium compound. In this example, a mercaptan oxidation catalyst, deactivated in a kerosene treating process, was evaluated with respect to a sour petroleum distillate—a kerosene fraction having an end-boiling point of 503° F. and containing 505 ppm by weight mercaptan sulfur. The catalyst originally consisted of about 0.5 wt. % cobalt phthalocyanine monosulfonate and about 18 wt. % quaternary ammonium chloride, disposed on 10–30 mesh activated charcoal particles of an apparent bulk density of about 0.25 gm/cc. The kerosene was charged down-flow through 100 cc of the deactivated catalyst disposed as a fixed bed in a vertical tubular reactor, the kerosene being charged at a liquid hourly space velocity of about 0.5 under 45 psig of air—sufficient to provide about 1.5 times the stoichiometric amount of oxygen required to oxidize the mercaptans contained in the kerosene. The catalyst bed was initially flushed with about 600 cc of water at about 100° C., and thereafter wetted with about 10 cc of an 8 wt. % aqueous caustic solution, 10 cc of said solution being subsequently charged to the catalyst bed at about 12 hour intervals admixed with the kerosene charged thereto. The treated kerosene was analyzed periodically for mercaptan sulfur. After about 300 hours on stream, the treated kerosene continued to display about 50 ppm mercaptan sulfur upon analysis. At this stage, 600 cc of hot (75° C.) water containing 0.25 gms of mixed benzyldimethylalkylammonium hydroxides, wherein the alkyl substituent was a straight chain $C_{12}$–$C_{18}$ alkyl substituent, was charged down-flow through the catalyst bed. After this reactivation treatment, the kerosene was analyzed to contain about 20 ppm mercaptan sulfur continuing over the subsequent 175 hours on stream.

EXAMPLE II

This example illustrates one embodiment of the method of this invention. In this example, a mercaptan oxidation catalyst, deactivated in a kerosene treating process, was evaluated with respect to a sour kerosene fraction having an end-boiling point of 486° F. and containing 873 ppm by weight mercaptan sulfur. The catalyst originally consisted of about 0.5 wt. % cobalt phthalocyanine monosulfonate and about 18 wt. % quaternary ammonium chloride, disposed on 10–30 mesh activated charcoal particles of an apparent bulk density of about 0.25 gm/cc. The kerosene was charged down-flow through 100 cc of the deactivated catalyst disposed as a fixed bed in a vertical tubular reactor, the kerosene being charged at a liquid hourly space velocity of about 0.5 under 45 psig of air—sufficient to provide about 1.5 times the stoichiometric amount of oxygen required to oxidize the mercaptans contained in the kerosene. The catalyst bed was initially flushed with about 600 cc of water at about 100° C. Thereafter, 125 cc of a solution comprising 0.15 gm of commercial grade (about 85% purity) monosulfonated cobalt phthalocyanine, 1 cc of 27 wt. % aqueous ammonia, and the balance deionized water, was charged down-flow through the catalyst bed, and recycled until it lost substantially all of its color. Thereafter, about 600 cc of a solution comprising 0.25 gms of mixed benzyldimethylalkylammonium hydroxides, wherein the alkyl substituent was a straight chain $C_{12}$-$C_{18}$ alkyl substituent, in water a temperature of about 100° C., was charged down-flow through the catalyst bed. The catalyst bed was thereafter wetted with about 10 cc of a 7 wt. % aqueous caustic solution, 10 cc of said solution being subsequently charged to the catalyst bed at about 12 hour intervals admixed with the kerosene charged thereto. The kerosene was analyzed for mercaptan content periodically over the subsequent 200 hours on stream. During that 200 hour period the mercaptan content of the treated kerosene stream averaged about 8 ppm by weight. At the end of the 200 hour period the mercaptan content of the treated kerosene was about 12 ppm by weight.

EXAMPLE III

This example illustrates the activity of the catalytic composite of Example II without the reactivation method of this invention. In this example, the mercaptan oxidation catalyst of Example II, deactivated in a kerosene treating process, was evaluated with respect to a sour kerosene fraction having an end-boiling point of 486° F. and containing 873 ppm by weight mercaptan sulfur. The catalyst originally consisted of about 0.5 wt. % cobalt phthalocyanine monosulfonate and about 18 wt. % quaternary ammonium chloride, disposed on 10-30 mesh activated charcoal particles of an apparent bulk density of about 0.25 gm/cc. The kerosene was charged down-flow through 100 cc of the deactivated catalyst disposed as a fixed bed in a vertical tubular reactor, the kerosene being charged at a liquid hourly space velocity of about 0.5 under 45 psig. of air—sufficient to provide about 1.5 times the stoichiometric amount of oxygen required to oxidize the mercaptans contained in the kerosene. The catalyst bed was initially flushed with about 600 cc of water at about 100° C., and thereafter wetted with about 10 cc of a 7 wt. % aqueous caustic solution, 10 cc of said solution being subsequently charged to the catalyst bed at about 12 hour intervals admixed with the kerosene charged thereto. The treated kerosene was analyzed periodically for mercaptan sulfur. At the beginning of the treating operation, the treated kerosene was analyzed to contain about 40 ppm by weight of mercaptan sulfur. At the end of the 200 hour run the treated kerosene was analyzed to contain about 44 ppm by weight mercaptan sulfur.

The results of the tests of the foregoing examples are summarized in the following Table.

TABLE

| Reactivation procedure | water & quat. compound | Water & phthalocyanine in aqueous ammoniacal solution & quat. compound | none |
|---|---|---|---|
| Mercaptan content, Wt. ppm | | | |
| Charge | 505 | 873 | 873 |
| Product, before reactivation | 50 | 40 | 40 |
| Product, end of run | 20 | 12 | 44 |
| Period of run, hrs. | 175 | 200 | 200 |

The foregoing examples show that reactivation of a deactivated catayltic composite comprising an adsorptive carrier and a metal chelate can be very effectively accomplished by the method of this invention. It is believed that the deactivation process occurring during a mercaptan treating operation results in part from the removal or reactivation of constituents originally disposed on the support material. In these examples, it is believed that the deactivated catalyst comprises substantially no quaternary ammonium compound. Example II, an example illustrating one embodiment of the method of this invention, shows that reactivation in accordance with the method of this invention increased by 70% the ability of a catalytic composite to reduce the mercaptan sulfur level of a very sour petroleum distillate. The reactivated catalytic composite was able to reduce the mercaptan sulfur content of a petroleum distillate from 873 ppm by weight to 12 ppm by weight after 200 hours of use. Example III, a control example, shows that without reactivation the catalytic composite used in Example II was much less effective, reducing the mercaptan sulfur content of a petroleum distillate from 873 ppm by weight to 44 ppm by weight after 200 hours of use. Example I shows the results of reactivation without use of an aqueous ammoniacal solution of a metal chelate. Although the sour petroleum distillates treated during the 175 hour run after reactivation was of a substantially lower mercaptan sulfur content (505 wt. ppm) than the sour petroleum distillate of Example II (873 wt ppm), the reactivation of Example I was not as effective as the reactivation of Example II. The method of this invention is clearly a superior method of reactivating a catalytic composite.

I claim as my invention:

1. A method of reactivating a deactivated mercpatan oxidation catalytic composite comprising an adsorptive carrier material and a metal chelate, said method comprising the steps of first contacting said composite with an aqueous ammoniacal solution of a metal chelate, and second contacting said composite with an aqueous solution of a quaternary ammonium compound at a temperature of from about 55° C. to about 175° C.

2. The method of claim 1 wherein said metal chelate is a metal phthalocyanine.

3. The method of claim 1 wherein said metal chelate is a cobalt phthalocyanine.

4. The method of claim 1 wherein said metal chelate is cobalt phthalocyanie monosulfonate.

5. The method of claim 1 wherein said aqueous ammoniacal solution of a metal chelate comprises from about 0.1 wt. % to about 5 wt. % ammonium hydroxide and from about 0.01 wt. % to about 1 wt. % metal phthalocyanine.

6. The method of claim 1 wherein said aqueous ammoniacal solution of a metal chelate comprises from about 0.1 wt. % to about 5 wt. % ammonium hydroxide and from about 0.01 wt. % to about 1 wt. % cobalt phthalocyanine monosulfonate.

7. The method of claim 1 wherein said first contacting step is carried out at a temperature of between about 20° C. to about 150° C.

8. The method of claim 1 wherein said adsorptive carrier material is an activated charcoal.

9. The method of claim 1 wherein said quaternary ammonium compound is represented by the structural formula:

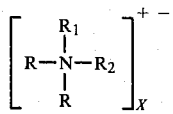

wherein R is a hydrocarbon radical containing up to about 20 carbon atoms and selected from the group consisting of alkyl, cycloalkyl, aryl, alkaryl, and aralkyl, $R_1$ is a substantially straight chain alkyl radical containing from about 5 to about 20 carbon atoms, $R_2$ is selected from the group consisting of aryl, aralkyl and alkaryl, and X is an anion.

10. The method of claim 1 wherein said quaternary ammonium compound is a benzyldimethylalkylammonium hydroxide wherein the alkyl substituent is a substantially straight chain alkyl radical containing from about 5 to about 20 carbon atoms.

11. The method of claim 1 wherein said quaternary ammonium compound is a benzyldimethylalkylammonium hydroxide wherein the alkyl substituent is a substantially straight chain alkyl radical containing from about 12 to about 18 carbon atoms.

12. The method of claim 1 wherein said quaternary ammonium compound is a benzyldimethyldodecylammonium hydroxide.

13. The method of claim 1 wherein said quaternary ammonium compound is benzyldimethyltetradecylammonium hydroxide.

14. The method of claim 1 wherein said quaternary ammonium compound is benzyldimethylhexadecylammonium hydroxide.

15. The method of claim 1 wherein said quaternary ammonium compound is benzyldimethyloctadecylammonium hydroxide.

16. The method of claim 1 wherein the concentration of said quaternary ammonium compound in said aqueous solution is from about 0.01 to about 10 wt. %.

17. The method of claim 1 wherein said second contacting step is carried out at a temperature of from about 55° C. to about 175° C.

18. The method of claim 1 wherein said second contacting step is carried out at a temperature of from about 90° C. to about 110° C.

* * * * *